Patented Oct. 8, 1940

2,217,167

UNITED STATES PATENT OFFICE 2,217,167

PROCESS FOR THE PRODUCTION OF ETHERS OF BUTANOL-1-ONE-3

Paul Halbig and Alfred Treibs, Munich, Germany, assignors to Consortium für Elektrochemische Industrie G. m. b. H., Munich, Bavaria, Germany, a corporation of Germany No Drawing. Application April 27, 1938, Serial No. 204,579. In Germany May 7, 1937

3 Claims. (Cl. 260—594)

This invention relates to the production of ethers of butanol-1-one-3.

It has been found that butene-1-one-3 adds on very easily and with good yield to organic hydroxyl compounds such as alcohols, glycols, glycol ethers, ketols, phenols, acids, hydroxy acids and the like. The hydroxyl-containing substances can themselves be substituted in various ways, for example, by one or more alkoxy- acyl-, amino-, substituted amino-, halogen-, hydroxyl-, thio-, carboxylic-, sulphonic- or other groups. The addition takes place in most cases with development of heat, by bringing together the reaction components in the presence of catalysts. The catalysts may be acids or bases, as, for example, hydrochloric acid, phosphoric acid, sulphuric acid, oxalic acid, or caustic soda, alkaline earths, alkali alcoholates, piperidine, or the like. The basic catalysts act in general more strongly than the acid catalysts. The reaction is often violent; it can be controlled by appropriate determination of the quantity of reaction components and of the catalysts, by means of an inert diluent or by cooling or similar assistance. The reaction can be carried out very well in continuous operation. Correct choice of the amount of catalyst is important; in general, the amount is kept as small as possible. The isolation of the ether can be accomplished most simply by careful neutralization; it is important, however, to remove the catalyst before the isolation. We have found in fact that the ether, upon distillation in presence of the catalyst for its formation, unexpectedly breaks down again into its components.

Instead of butenone, its hydration products, for example butanol-1-one-3 can also be reacted with hydroxyl-compounds.

The compounds can easily be reduced to butylene glycol ethers. These, and their reduction products, are (or some of them are), valuable solvents or softeners, and can be employed for the synthetic manufacture of medicinal products, dyestuffs, polymerisation products and the like.

Example 1

A mixture of equimolecular amounts of butenone and methyl alcohol is reacted with, for example, 0.5% of 20 N sulphuric acid. When treating fairly large batches the evolved reaction heat should be removed by cooling. After neutralization with magnesium oxide and filtration, small amounts of unreacted starting materials are separated by distillation under vacuum, and the butanolone methyl ether obtained, as an easily mobile liquid of boiling point 35° C. under 12 mm. pressure, $$D_4^{21}: 0.924$$

The reaction takes twelve hours at 20° C., and is more rapid at higher temperatures. The yield calculated on the isolated butanolone methyl ether is more than 85%, and the uncombined material is almost quantitatively recovered, and can be used again in the reaction.

Example 2

One part of butenone and two parts of ethyl alcohol are reacted as described in Example 1. The yield, calculated on the isolated butanolone ethyl ether, is more than 90%, and the unreacted material is completely recovered. Boiling point 44° C. at 11 mm. pressure $$D_4^{21}: 0.900$$

The ether formation also takes place to a substantial extent in presence of water, for example with 73% alcohol. Instead of starting out from butenone butanolone can be reacted with alcohol, preferably by boiling in presence of some acid. Employing other alcohols, the reactions are equally good, as will be seen by the following examples.

Example 3

Proceeding according to Example 2 with isopropyl alcohol, butanolone isopropyl ether of boiling point 48° C. at 10 mm. pressure is obtained, yield over 95%.

Example 4

Proceeding according to Example 1 with butyl alcohol, butanolone butyl ether of boiling point 71° C. at 10.5 mm. pressure is obtained, in about the same yield.

Example 5

Proceeding according to Example 1 with ethylene-glycol-monoethyl-ether, ethylene-glycol-ethyl-ether-$\beta$-keto-butyl-ether of boiling point 60° C. at 1 mm. pressure is obtained.

Example 6

Equimolecular amounts of butanolone and butenone reacted according to Example 1, give almost quantitatively di-$\beta:\beta'$-keto-butyl-ether of boiling point 82° C. at 0.5 mm. pressure.

Example 7

One part of butenone is brought into reaction with two parts of methyl alcohol under cooling, and with, for example, 0.2% (calculated on the mixture) of 10 N caustic soda. After neutralisation, the excess of methyl alcohol is separated off by vacuum distillation and the butanolone methyl-ether distilled in vacuum.

Example 8

A mixture of two parts each of butenone and ethyl-alcohol was allowed to drop into one part of ethyl alcohol, which contained 0.05% to 10 N caustic soda. By cooling, the temperature was maintained at 15° to 20° C. The butanolone ethyl-ether was recovered by neutralisation and distillation as above described. The alkaline catalysts acted more rapidly than the acids.

The invention claimed is:

1. Process for producing ethers of butanol-(1)-one-(3) which comprises reacting an alcohol with butene-(1)-one-(3) in the presence of a catalyst selected from the group consisting of strong acids and bases, neutralizing said catalyst, and then recovering said ether.

2. Process for producing ethers of butanol-(1)-one-(3) which comprises reacting an alcohol with butene-(1)-one-(3) in the presence of a strong acid catalyst, neutralizing said acid catalyst, and then recovering said ether.

3. Process for producing ethers of butanol-(1)-one-(3) which comprises reacting an alcohol with butene-(1)-one-(3) in the presence of a strong base catalyst, neutralizing said base catalyst, and then recovering said ether.

PAUL HALBIG.
ALFRED TREIBS.

CERTIFICATE OF CORRECTION.

Patent No. 2,217,167.   October 8, 1940.

PAUL HALBIG, ET AL.

It is hereby certified that error appears in the printed specification of the above numbered patent requiring correction as follows: Page 1, second column, line 17, for "90%" read --95%--; page 2, first column, line 10, for the word "to" before "10" read --of--; and that the said Letters Patent should be read with this correction therein that the same may conform to the record of the case in the Patent Office.

Signed and sealed this 5th day of November, A. D. 1940.

(Seal)   Henry Van Arsdale,
Acting Commissioner of Patents.